United States Patent
Howard

[11] Patent Number: 6,007,226
[45] Date of Patent: Dec. 28, 1999

[54] FIBER OPTIC LIGHT

[76] Inventor: Edward B. Howard, 9951 S. Bullington Rd., Fredericksburg, Ind. 47120

[21] Appl. No.: 09/018,523

[22] Filed: Feb. 4, 1998

[51] Int. Cl.[6] .......................................... F21V 8/00
[52] U.S. Cl. ........................... 362/576; 362/552; 362/147; 362/298
[58] Field of Search ..................... 362/298, 511, 362/310, 276, 552, 580, 558, 554, 576, 147

[56] References Cited

U.S. PATENT DOCUMENTS

| | | | |
|---|---|---|---|
| 4,415,952 | 11/1983 | Hattori et al. ...................... 362/276 X |
| 4,458,303 | 7/1984 | Berns .................................. 362/298 X |
| 4,958,263 | 9/1990 | Davenport et al. ...................... 362/32 |
| 5,042,894 | 8/1991 | Swemer .................................. 385/33 |
| 5,117,312 | 5/1992 | Dolan .................................. 362/554 X |
| 5,311,410 | 5/1994 | Hsu et al. ................................ 362/20 |
| 5,315,490 | 5/1994 | Bastable .................................. 362/32 |
| 5,325,272 | 6/1994 | Miller .................................. 362/32 |
| 5,452,186 | 9/1995 | Dassanayaki .......................... 362/80 |
| 5,526,237 | 6/1996 | Davenport et al. ................ 362/298 X |
| 5,560,699 | 10/1996 | Davenport et al. ................ 362/298 X |
| 5,842,767 | 12/1998 | Rizkin et al. ...................... 362/298 X |

Primary Examiner—Laura K. Tso
Attorney, Agent, or Firm—Joseph N. Breaux

[57] ABSTRACT

A fiber optic light which utilizes optic fibers to direct light from a single light source to a plurality of light emitting locations, thereby illuminating desired locations, while also providing an optical lighting system suitable for house, office or hospital use. The lighting apparatus reduces electricity and light bulb consumption, provides a system which does not require electrical wiring throughout the building and provides a central location for servicing the lighting needs and controlling light intensity for numerous locations throughout a building.

1 Claim, 3 Drawing Sheets

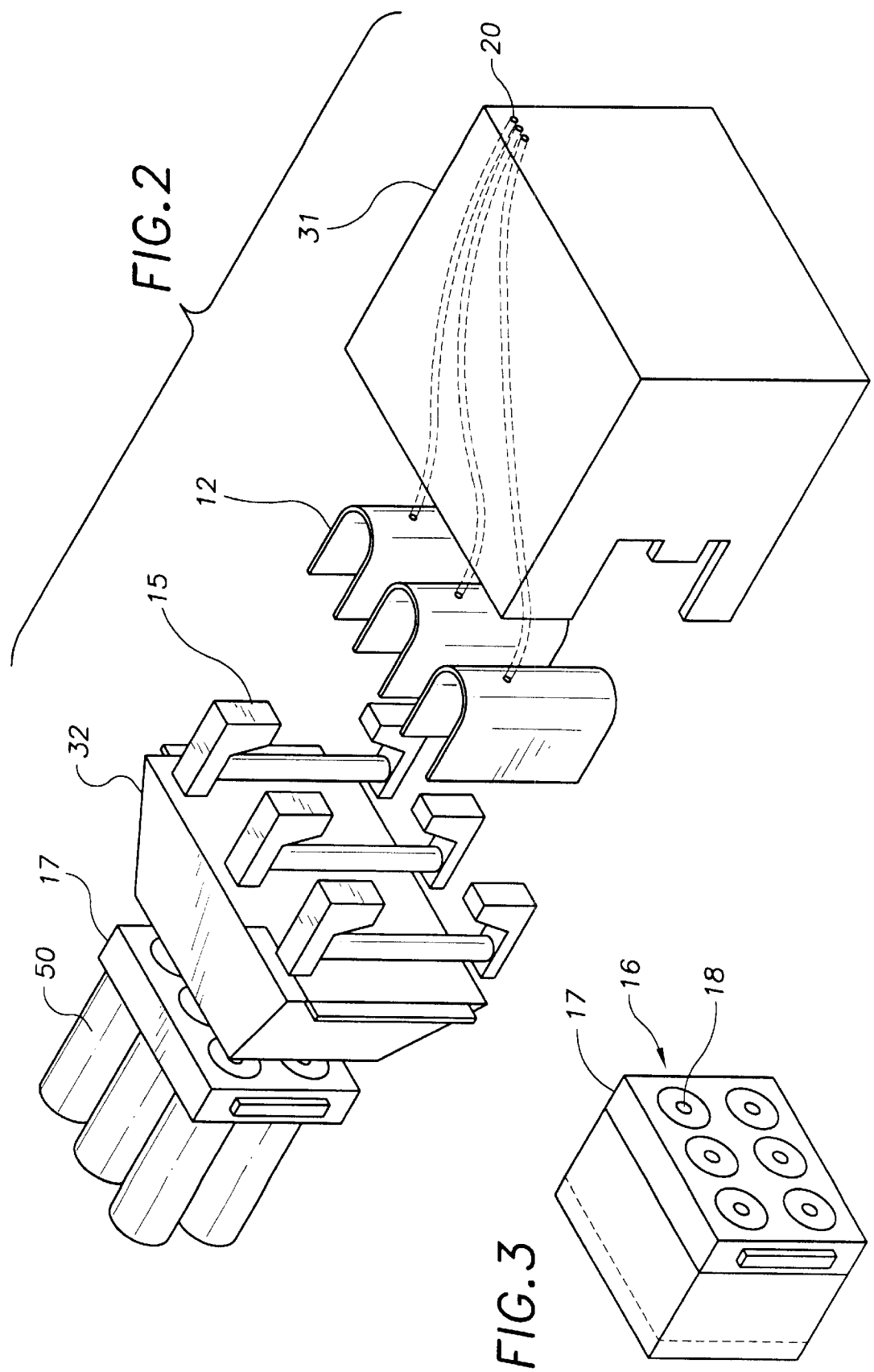

FIBER OPTIC LIGHT

TECHNICAL FIELD

This present invention relates to an optic fiber light and more particularly to a lighting apparatus which utilizes optic fibers to direct light from a single light source to a plurality of light emitting locations, thereby illuminating desired locations, while also providing a means for providing an optical lighting system suitable for house, office or hospital use, and a means for independently controlling the intensity of light emitted and operation for a single optic fiber. The lighting apparatus reduces electricity and light bulb consumption, provides a system which does not require electrical wiring throughout the building and provides a central location for servicing the lighting needs for numerous locations throughout a building.

BACKGROUND ART

The development of optic fiber has spawned numerous innovations in areas such as communications and lighting. Optic fibers have previously been utilized for directing light sources to specific locations, although these prior devices are useful for vehicles, signs and other specializes purposes, they do not provide a lighting system suitable for home, business and hospital use and further do not provide an apparatus which saves electrical usage in buildings and consumables such as light bulbs. The inventor has found that it is extremely desirable to provide a lighting system with one central light source location with optic fibers directing light to desired locations within a room or building. Additionally, it is also desirable to be able to service the lighting needs for a building from a single location, while also minimizing the amount of electrical wiring needed for providing light within a building. The present invention provides a optic lighting system with a central light source contained within a housing which can be centrally located in a convenient location within the building, while the light source may be numerous light bulbs mounted within the housing and a means for concentrating the light from the bulbs to the ends of a plurality of optic fibers, while the optic fibers provide a means for transmitting the light to different locations throughout the building. A means is also provided to control light entering the light gathering end of each optic fiber and also for controlling the amount of light which enters each optic fiber.

U.S. Pat. No. 5,452,186 discloses and claims an optic fiber light distribution system adaptable for use in a vehicle. This device utilizes a fixed single light source and a plurality of lighting tubes to direct light to specific locations. The device is very useful for lighting automobiles but it does not provide and is not adaptable to provide a lighting means for a building such as a house. Nor does the prior device provide a means for controlling the light operation or intensity at each optic fiber. The present invention provides a lighting source housing which is vented and dimensioned, allowing a plurality of lighting sources to be mounted in an isolated and convenient location within the building. Additionally, a lighting reflective means is contained within the housing which concentrates the light emitted from the source(s) and directs it to an optic fiber end and each end is fitted with a means for controlling light entry into the optic fiber.

U.S. Pat. No. 5,042,894 discloses and claims a fiber optic lighting system for signs wherein the optic fiber light emitting end terminal at different points of a sign to create an image. The emitting ends are further enclosed within a housing fitted with lenses. This devise is very useful for illuminating signs, however it is not adaptable for house use and is not capable of adaptation to provide an optic fiber lighting device with a light source containing housing which may contain several light sources in communication with several optic fiber ends, and further wherein the optic fibers transmit light to different locations within a building, with each optic fiber having separate means for controlling light emitting intensity.

U.S. Pat. No. 4,958,263 discloses a centralized lighting system employing a high brightness light which directs light to selected positions on an automobile. The device is very useful, like the 186 patent, however the prior device is not adaptable for building use. The need for a higher watt light source for building use leads to considerable heat buildup near the optic fiber thus requiring the optic fiber end to be placed at a distance from the fiber end to prevent fiber material degradation. The present inventions for use in automobiles are made compactly to be fit within the confines available in the automobile. The present invention uses a single or plurality of high wattage light bulbs which requires the light source to be positioned away from the optic fiber end, which then leads to the need of concentrating the light and focusing it to the end of the fiber. The present invention utilizes a pair of parabolic dishes to concentrate the light to the optic fiber end, this dual parabolic system allows the high wattage bulb to be used without damaging the optic fiber end. Additionally, the present device utilizes a means for controlling light intensity transmitted from each optic fiber.

The inventor has found that the present invention overcomes numerous problems associated with conventional light systems, namely the present invention provides a means to direct lighting within a house or building to numerous locations without the need for installation of wiring, and numerous electrical switches. The invention also allows the lighting needs of a house or building to be centrally located within the building while one or more light sources are utilized and maintained in a central location while the light is delivered to remote locations with optic fibers. Since fewer light sources are employed, fewer light bulbs must be replaced and less electricity is used to light a given area. The disclosed lighting system also allows for selectively controlling light intensity transmitted from each optic fiber, by utilizing a camera eye located at each optic fiber light gathering end the light entering the optic fiber is controlled and may also be adjusted depending upon the desired light intensity for each location.

GENERAL SUMMARY DISCUSSION OF INVENTION

It is thus an object of the invention to provide a fiber optic light that is adaptable for use in houses, offices, hospitals and other buildings wherein a light source is centrally located within the building and a plurality of optic fibers with one end positioned near a light source and a light emitting end positioned to emit light in a desired location within the building. The centrally located light source provides a means to illuminate numerous locations within the house with a single light source, thereby decreasing electrical usage and saving light bulb usage.

It is a further object of the invention to provide a fiber optic light that includes an easily maintained central light source and a plurality of optic fibers directing light to desired locations while also providing a high wattage light source with a dual parabolic system to focus the light to an end of a optic fiber allowing the optic fiber to be placed at a distance from the light bulb so that the heat from the bulb does not degrade the optic fiber. The lighting source may also contain a plurality of light sources with the lighting housing.

Accordingly, a Fiber Optic Light is provided which is particularly adapted for use in a building such as a house, office, or hospital which includes a centrally located light source containing one or more light sources enclosed within a housing, and a plurality of optic fibers, with light gather ends positioned near the light source fitted with a light intensity control, while the other end of the optic fibers are positioned in desired locations within or around the building.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an exploded view of the optic fiber light,

FIG. 3 is a perspective view of a bundle of optic fiber light gathering ends.

EXEMPLARY MODE FOR CARRYING OUT THE INVENTION

Figure 1:
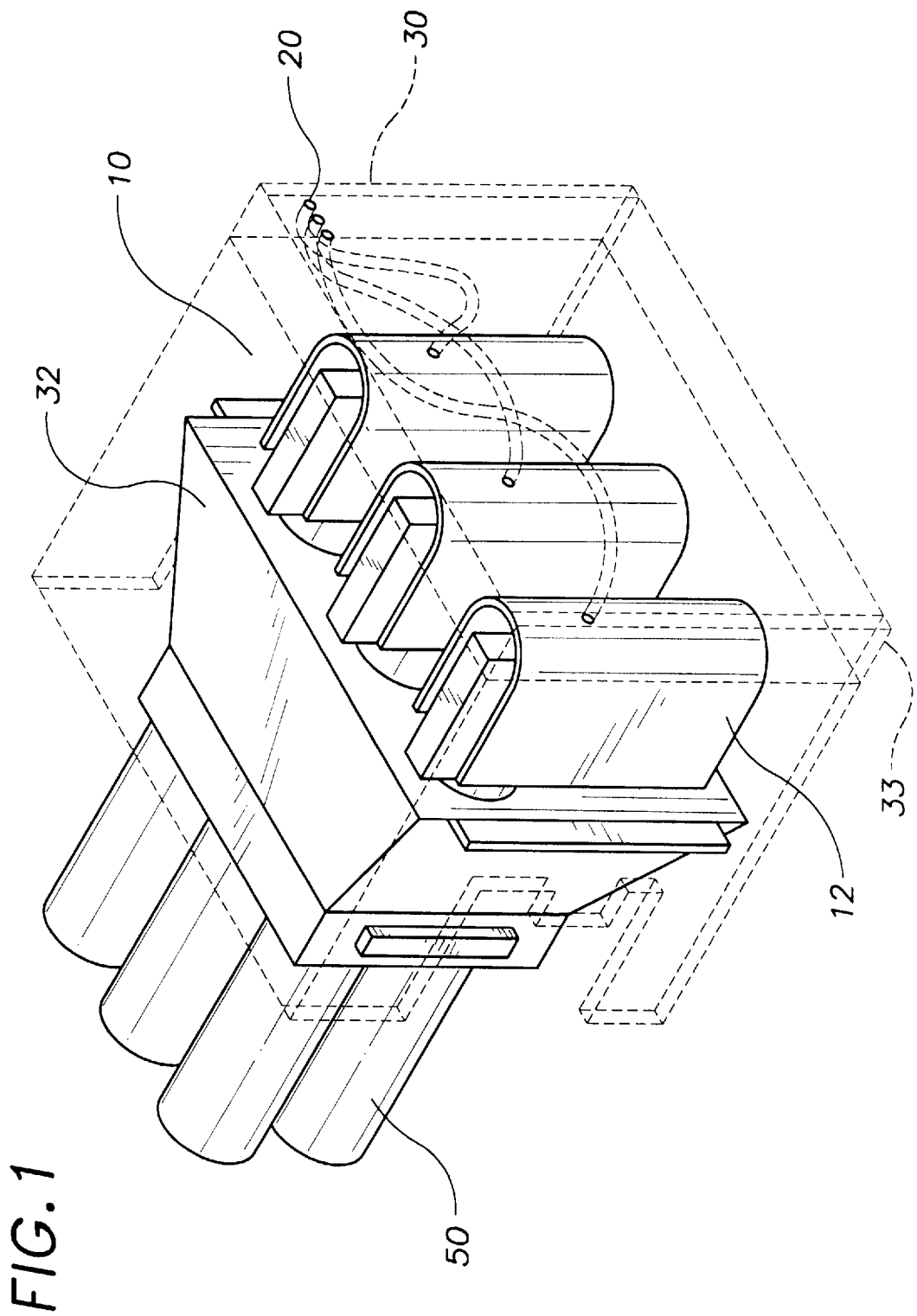
FIG. 1 is a perspective view of the optic fiber light.
Figure 4:
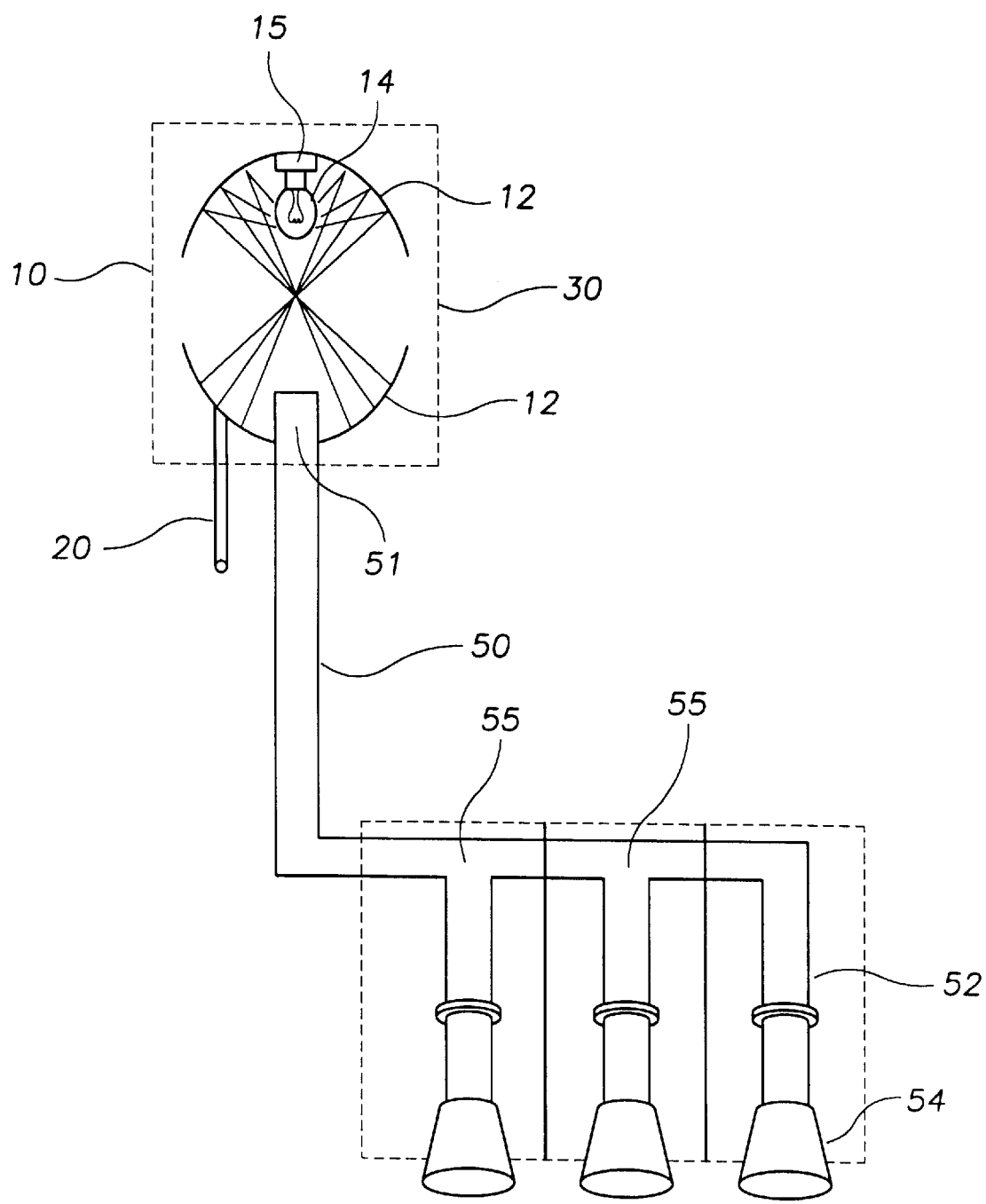
FIG. 4 is a schematic of the optic fibers and the light source with a pair of parabolic reflectors along with an optic fiber light adsorbing end.

It can be seen from the preceding description that the invention is particularly useful for providing light to selected areas of a building, while the lighting source is centrally located in both a convenient and secluded location. FIG. 1 illustrates the fiber optic's light source 10 mounted within a housing 30, while the optic fibers 50 exit the back side of the housing and extend to desired light emitting areas of the building. A schematic of a complete fiber optic lighting system depicting all major component parts is illustrated in FIG. 4. The light source 10 comprises a pair of parabolic dishes 12, a light bulb 14 and a light operation detector 20 all contained within the housing. The optic fiber 50 has a light gathering end 51 positioned between the pair of parabolic dishes 12 and preferably position to gather a maximum amount of the light reflected by the dishes. The optic fiber light emitting ends 52 are fitted with lighting fixtures 54. While FIG. 4 illustrates three lighting fixtures aligned, in practice these lighting fixtures can be separated and placed in any desired location limited only by the length of optic fiber provided. One optic fiber 50 may be branched to many locations by use of "T" connectors 55.

The light source 30 is preferably fitted with a high intensity lamp bulb 14, while the scattered light is gathered by the highly reflective parabolic dishes 12 and focused to a light gathering end 51 of each optic fiber 50. Although FIG. 4 illustrates the light gathering end 51 to be between the parabolic dishes 12, the end 51 may be positioned where necessary in order to gather the maximum light from the bulb 14. Preferably the optic fiber gathering end is positioned in an area where heat will not build-up and melt or degrade the optic fiber. The lamp 14 is preferably a high intensity "arc" type lamp which use either sodium, mercury, or even a microwave excited sulfur powder within a vacuum glass envelope. The parabolic dishes 12 must be highly polished, as well as other reflective component parts within the light housing.

The optic fibers 50 may be separately attached to the housing or bundled 16 as illustrated in FIG. 3. The optic fiber bundle 16 is contained within a optic fiber gathering end mount 17 which also contains the camera eye shutter type light control means 18 for limiting light entry into each optic fiber light gathering end. The light control means may also be a gate, gelatin or other means to effectively block or control light entry.

The housing 30 includes a external protective housing 31 an internal conical housing 32, light bulb mount 15, and light operation detectors 20. The optic fiber bundle 16 mounts to the rear of the housing while the front of the housing is fitted with an inspection door 33 for entry into the housing. The light operation detectors 20 are separate optic fibers with one light gathering end positioned near the light source and the other emitting end mounted in apertures in the housing. The emitting end will glow if the lighting source is in operation.

It is noted that the embodiment of the Fiber Optic Light described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fiber optic light apparatus comprising:

a) a light source contained within a light source housing, said light source comprising a light bulb positioned between a pair of opposing parabolic dishes, b) an optic fiber comprising a light gathering end and a light emitting end, said parabolic dishes and said light gathering end are positioned so that light emitted from the light is focused to the light gathering end, c) a means for controlling the amount of light entering the light gathering end, and d) a light diffusing fixture positioned on the light transmitting end of the optic fiber;

said light controlling means comprising a camera lens type shutter positioned on each optic fiber light gathering end.

* * * * *